Patented Oct. 11, 1949

2,484,536

UNITED STATES PATENT OFFICE 2,484,536

MESO ALKYL MERCAPTO SUBSTITUTED CARBOCYANINES AND PROCESS FOR PREPARING SAME

Leo Arnold Van de Straete, Mortsel-Antwerp, Belgium, assignor to Gevaert Photo-Producten N. V., Antwerp, Belgium, a company of Belgium No Drawing. Application June 13, 1947, Serial No. 754,605. In the Netherlands December 12, 1940

Section 1, Public Law 690, August 8, 1946
Patent expires December 12, 1960

7 Claims. (Cl. 260—240)

1

The present invention relates to symmetrical and unsymmetrical carbocyanine dyes substituted at the central carbon atom by an alkyl mercapto or a substituted alkyl mercapto group, and to a process for preparing them.

It is already known that symmetrical meso alkyl mercapto substituted carbocyanines may be obtained by allowing imidodithio-carbonic esters of the following general formula:

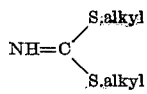

to react with quaternary nitrogenous bases having a reactive methyl group in alpha-position. This reaction produces chiefly meso-alkyl carbocyanines and but very small quantities of meso alkyl mercapto carbocyanines.

It is an object of my invention to provide new unsymmetrical meso alkyl or substituted-alkyl mercapto carbocyanines. A further object of my invention is to provide a new process for preparing both the symmetrical and unsymmetrical meso alkyl or substituted-alkyl mercapto carbocyanines. Further objects will appear from the following description.

I have now found that both unsymmetrical and symmetrical meso alkyl or substituted-alkyl mercapto carbocyanines can be produced with a very satisfactory yield by allowing quaternary cyclammonium salts containing a reactive alkyl group to react with intermediate substances of the following general formula:

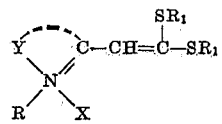

wherein

Y = the non-metallic atoms required for completing a five or six membered heterocyclic nucleus optionally having a benzene or naphtalene nucleus fused on, R and R₁ = alkyl or substituted alkyl,

2

X = an acid residue, e. g. Cl, Br, I, CH₃SO₄ and ClO₄.

The reaction is preferably proceeded with in the presence of condensing agents of basic nature such as pyridine, piperidine and tri-ethylamine, or of acid anhydrides as acetic anhydride. In the following description the numbering of the heterocyclic nitrogen bases starting from the heteroatoms as e. g. the S- or the Se-atom, β-naphtothiazone, represents the 4-5-phenylene substituted benzothiazole, whereas α-naphtothiazole represent 6-7-phenylene substituted bentothiazole.

The intermediate substances to be used according to my invention, are obtained from 2-methylene bases and the methylene bases themselves from quaternary cyclammonium salts with a reactive alkyl group by means of strong inorganic bases such as sodium hydroxide and potassium hydroxide. Methylene bases particularly appropriate for carrying out this process are e. g.:

(a) 2-methylene-3-methyl-β-naphthothiazoline:

16 g. of 2-methyl-β-naphthothiazole dimethyl sulphate are dissolved in 200 cc. ethyl alcohol. Next 8 g. of sodium hydroxide and 10 cc. of water are added. After vigorously shaking until dissolution of the sodium hydroxide, about 7.6 g. of 2-methylene base are precipitated. Melting point is 147° C. (after thoroughly washing with water, alcohol and ether).

Reaction-scheme:

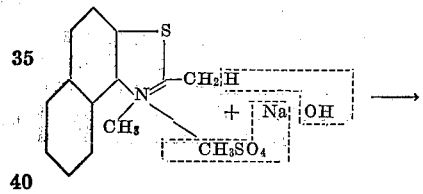

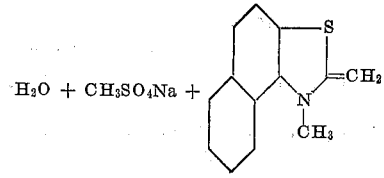

(b) 2-methylene-3-6-dimethylbenzothiazoline:

12 g. of 2-6-dimethyl benzothiazole dimethyl sulphate are dissolved in 150 cc. of acetone. The solution is treated with 6 g. of sodium hydroxide and 7 cc. of water. After separating and adding water to the acetone layer, 7 g. of methylene base are precipitated. Melting point is 168°.

(c) 2-methylene-3-ethyl-6-methoxyquinoline:

10 g. of 6-methoxy quinaldine ethyl bromide are dissolved in 10 cc. of water. Next 40 cc. of sodium hydroxide solution 2N are introduced. The methylene base crystallises out as brown powder. Melting point is 105°. Yield 4.3 g.

(d) 2-methylene-3-ethyl benzothiazoline:

16 g. of 2-methyl benzothiazole di-ethyl sulphate are dissolved in 200 cc. of acetone. Next 8 g. of sodium hydroxide and 10 cc. of water are added. Further treatment as for the 3-6-dimethyl base. Melting point is 136°. Yield 6 g.

On treating in the same way are obtained:

(e) 2-methylene-3-benzylbenzothiazoline (melting point at 143°).

(f) 2 - methylene-3-methyl-α-naphthothiazoline (melting point at 180°).

(g) 2 - methylene - 3 - methyl - 6 - chloro-benzothiazoline (melting point at 155°).

(h) 2 - methylene - 3 - methyl-6-methoxybenzothiazoline (melting point 136°).

(i) 2 - methylene-3-6-dimethylbenzoselenazoline (melting point 167°).

(j) 2 - methylene-3-methyl-6-acetylaminobenzothiazoline (melting point 105°).

(k) 2-methylene-3-ethylbenzoselenazoline (melting point 138°).

All these 2-methylene bases form with carbon sulphide very characteristic additive compounds of the following probable formula:

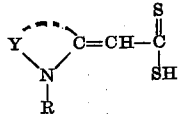

As examples of these additive compounds as well as of the process for their preparation may be cited:

*2-methylidene dithiocarboxylic acid of N-methyl-β-naphthothiazol*

12 g. of 2-methylene-3-methyl-β-naphthothiazoline are dissolved in 8 l. of anhydrous alcohol. Next 135 cc. of carbon sulphide are added. After keeping 3 days at ordinary temperature a yellow powder is separated. Melting point 264° (after washing with boiling alcohol). The product is insoluble in the usual solvents. Yield 6.4 g.

*2-methylidene dithiocarboxylic acid of 3-6-dimethylbenzothiazol*

47 g. of 2-methylene-3-6-dimethylbenzothiazoline are dissolved in 750 cc. of benzene. Next 21 cc. of carbon sulphide are introduced. After two days a yellow deposit is obtained. Melting point 231° (after crystallisation from pyridine). Yield 11.5 g.

*2-methylidene dithiocarboxylic acid of 3-methylbenzoselenazol*

6 g. of 2-methylene-N-methylbenzoselenazoline are dissolved in 80 cc. of ethyl alcohol and 25 cc. of carbon sulphide are added. After two days 1.5 g. of additive compound is obtained. Melting point 237°.

By proceeding in the same way are also obtained:

2-methylidene dithiocarboxylic acid of 3-benzylbenzothiazol (M. P. 235°).

2-methylidene dithiocarboxylic acid of 3-methyl-α-naphthothiazol (M. P. 275°).

2-methylidene dithiocarboxylic acid of 3-methyl-6-chloro-benzothiazol (M. P. 288°).

2-methylidene dithiocarboxylic acid of 3-ethyl-6-dimethylamoninobenzothiazol (M. P. 225°).

2-methylidene dithiocarboxylic acid of 3-methyl-6-dimethylaminobenzothiazol (M. P. 240°).

2-methylidene dithiocarboxylic acid of 3-ethylbenzothiazol (M. P. 232°).

2-methylidene dithiocarboxylic acid of 3-methyl-6-methoxybenzothiazol (M. P. 239°).

2-methylidene dithiocarboxylic acid of 3-ethylbenzoselenazol (M. P. 240°).

2-methylidene dithiocarboxylic acid of 3-methyl-5-6-dimethoxybenzothiazol (M. P. 245°).

2-methylidene-(α-methyl)-dithiocarboxylic acid of 3-methylbenzothiazol (M. P. 226°).

2-methylidene-(α-methyl)-dithiocarboxylic acid of 3-methylbenzoselenazol (M. P. 230°).

2-methylidene dithiocarboxylic acid of 3-6-dimethylbenzoselenazol (M. P. 238°).

2-methylidene dithiocarboxylic acid of 3-methyl-6-thiomethylbenzothiazol (M. P. 247°).

2-methylidene dithiocarboxylic acid of 3-ethyl-6-methoxyquinoline (M. P. 204°).

2-methylidene dithiocarboxylic acid of 3-methyl-α-naphthoquinoline (M. P. 200°).

From these additive compounds may finally be obtained, by addition of an alkyl or substituted alkyl ester, as for instance, dimethyl sulphate, the desired intermediate substances of the following probable formula:

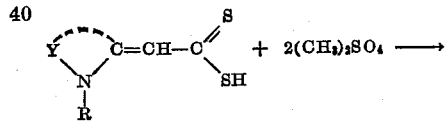

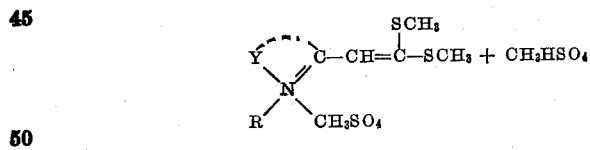

Other examples of such esters are: diethyl sulphate, ethyl ester of para-toluene sulphonic acid, methyl ester of para-toluene sulphonic acid, benzyl ester of para-toluene sulphonic acid.

According to the present invention carbocyanines may successfully be produced which are substituted on the central carbon atom by an alkyl mercapto group. These dyestuffs will be symmetrical or unsymmetrical according to whether the cyclammonium salt employed is identical or not with the heterocyclic nucleus of the used intermediate substance corresponding with formula 1.

The said carbocyanine dyestuffs, especially the unsymmetrical dyestuffs, are useful sensitizers for photographic emulsions.

*Example 1*

2.4 g. of N-methyl-2-methylidene benzothiazoline dithiocarboxylic acid are heated with 3.8 g. of dimethyl sulphate at 125–130° during two hours. By cooling, the liquid reaction mixture solidifies. On crystallizing from methyl alcohol, in which the non-alkylated acid is insoluble, an intermediate substance corresponding to the following formula

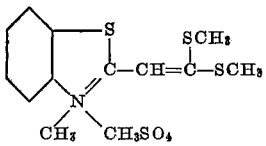

precipitates. Melting point 230° C. Determination of S:33.57%. Calculated amount 33.70%.

3.8 g. of this intermediate substance and 2.75 g. of 2-methyl-benzothiazol dimethyl sulphate are dissolved in boiling anhydrous methyl alcohol. An amount of pyridine equal to the amount of methyl alcohol used is added and the mixture is boiled during one hour. After addition of a potassium bromide 10% solution, a dyestuff of the following formula

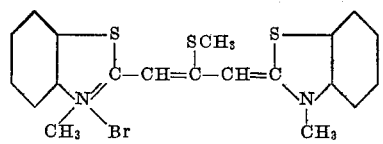

is obtained. Determination of S:20.64%, N: 5.92%, Br:17.22%. Calculated amount, S:20.73%, N:6.04%, Br:17.27%.

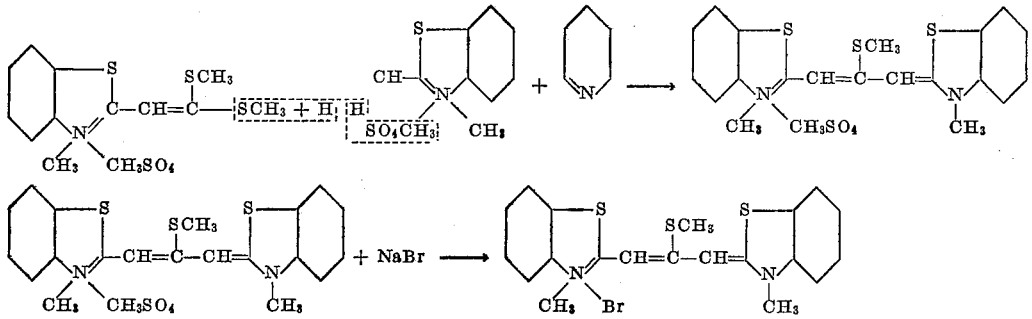

Example 2

To 1.9 g. of the intermediate substance obtained according to Example 1, and 1.1 g. of 2-methyl-thiazoline methiodide dissolved in 50 cc. of methyl alcohol, 1 cc. of triethylamine is added. The mixture is boiled during one hour. On addition of a solution of potassium iodide 10%, the carbocyanine of the probable formula

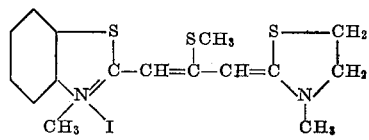

precipitates and is then recrystallized from ethyl alcohol.

Example 3

3.8 g. of the intermediate substance obtained according to Example 1 and 3.25 g. of 2-methyl-β-naphthothiazol dimethyl sulphate are treated as indicated in Example 1. On addition of a solution of potassium iodide 10%, a dyestuff of the probable formula

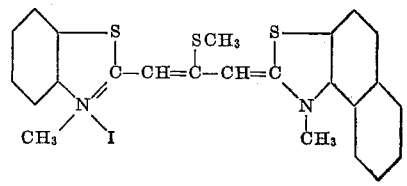

precipitates, which is recrystallized from alcohol. Determination of S:17.52%. Calculated amount: 17.14%.

Example 4

To 3.8 g. of the intermediate substance according to Example 1 and 3.2 g. of benzoselenazole dimethyl sulphate, dissolved in anhydrous methyl alcohol, are added 2 cc. of triethylamine. After having boiled the mixture during one hour followed by a treatment as indicated in Example 3, a dyestuff of the probable formula

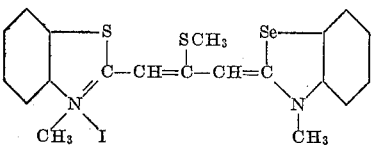

is obtained.

Example 5

2.9 g. of N-methyl-2-methylidene benzoselenazoline dithiocarboxylic acid are heated with 3.8 g. of dimethyl sulphate at 125° C. during two hours. After cooling, the mass, which has again solidified, is recrystallized from methyl alcohol and an intermediate substance of the probable formula

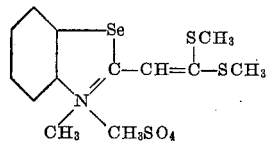

is obtained. Melting point 228° C.

4.27 g. of this intermediate substance and 3.25 g. of 2-methyl-β-naphthothiazole dimethyl sulphate are treated as indicated in Example 4. The dye precipitated by means of a potassium bromide solution has the general formula

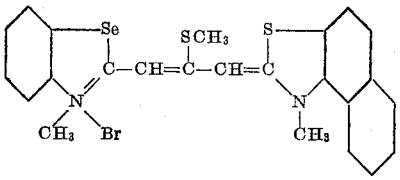

Example 6

10 g. of N-methyl-2-methylidene-benzoselenazoline-dithiocarboxylic acid are heated with 20 cc. of diethyl sulphate on a glycerol bath at 125° for 3 hours. After cooling, the mixture is washed with ether and dissolved in 125 cc. of methyl alcohol. After filtration 75 cc. of a 20% potassium bromide solution are added. Freed by filtration from insoluble secondary products, the solution is treated with 200 cc. ether and cooled to 0° C. An intermediate substance of the probable formula

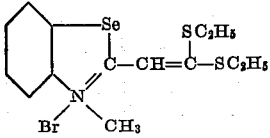

is obtained. Melting point 165° C. Yield 6.5 g.

To 2.4 g. of this intermediate substance and 1.3 g. of N-carboxy-methyl-2-5-dimethyl-benzothiazole chloride, dissolved in 65 cc. of methyl alcohol, 2 cc. of triethyl amine are added and the mixture is heated for one hour. Freed by filtration from insoluble secondary products the solution of the dye is treated with a sodium perchlorate solution 10%. A dyestuff of the following probable formula crystallizes:

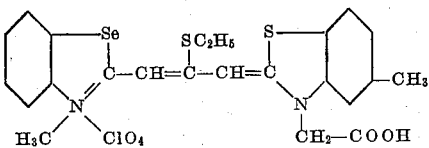

*Example 7*

Starting from 2.4 g. of the intermediate substance made according to Example 6 and 1.4 g. of N - carboxymethyl-2-methyl - 5 - chlorobenzothiazole chloride, dissolved in 80 cc. of methyl alcohol, 2 cc. of triethyl amine are added and the mixture is boiled for one hour. By adding a solution of potassium iodide 10%, the formed carbocyanine of the probable formula

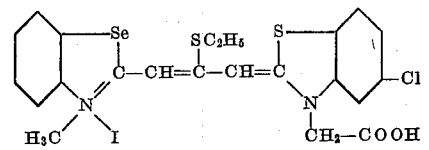

crystallizes.

*Example 8*

Proceeding in the same way as in Example 6 and starting from 1.3 g. N-carboxymethyl-2-6-dimethyl-benzothiazole chloride and 2.4 g. of intermediate substance, a dye of the following probable formula

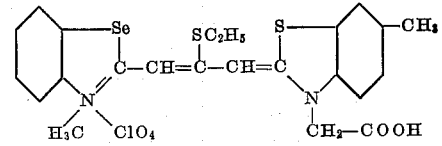

is obtained.

*Example 9*

10 g. of N-methyl-2-methylidene benzothiazoline dithiocarboxylic acid are heated with 20 cc. of diethyl sulphate on a glycerol bath at 125–130° C. for two hours. After cooling, the mixture is dissolved in methyl alcohol and on addition of a solution of potassium iodide 10%, an intermediate substance of the probable formula

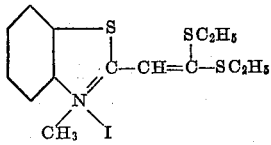

is obtained. The product is recrystallized from methyl alcohol. Melting point 178° C.

Starting from 2.5 g. of this intermediate substance and 1.95 g. of 2-methylbenzoselenazole dimethyl sulphate, as indicated in Example 4, a dye according to the following probable formula

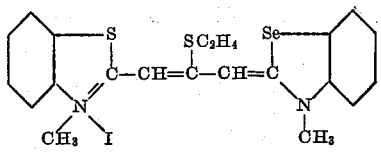

is obtained.

*Example 10*

Starting from 3 g. of the intermediate substance according to Example 9, and 1.95 g. of 2-methyl-benzothiazole dimethyl-sulphate, a dye of the following probable formula is obtained

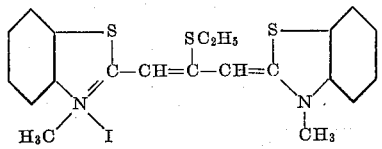

*Example 11*

On proceeding in the same way and starting from 2 g. of the intermediate substance according to Example 9, and 1.6 g. of 2-6-dimethylbenzoselenazole dimethyl sulphate a dyestuff of the probable formula

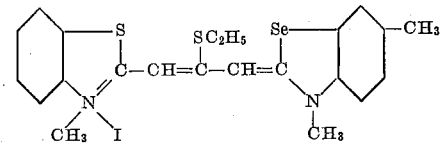

is obtained.

*Example 12*

10 g. of N-methyl-2-methylidene-β-naphthothiazoline dithiocarboxylic acid are heated with 30 cc. of diethyl sulphate at 125° C. during five hours. After cooling, the solidified reaction mixture is dissolved in 75 cc. of ethyl alcohol and precipitated with a solution of potassium bromide 10%. After 24 hours a dark coloured half-solid deposit is formed. This is dissolved in alcohol and ether is added to the cooled solution. Melting point 177° C. The product corresponds probably with the formula

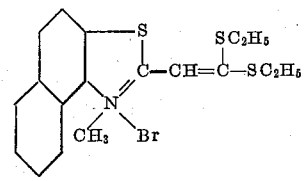

To 2.15 g. of this intermediate substance and 1.35 g. of quinaldine dimethyl sulphate, disssolved in 60 cc. anhydrous ethyl alcohol, 1.2 cc. of triethylamine is added and the mixture is boiled during one hour. By means of a solution of potassium iodide the unsymmetrical carbocyanine corresponding to the probable formula

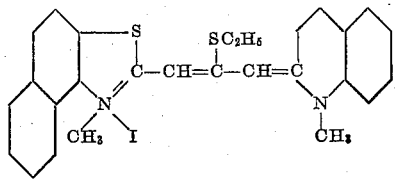

precipitates and it is purified by fractional crystallization.

*Example 13*

To 1.9 g. of the intermediate substance according to Example 12 and 1.5 g. of 2-methyl-6-dimethylaminobenzothiazole methiodide, dissolved in 250 cc. of alcohol, 2 cc. of triethylamine are added and the mixture is boiled during one hour. After cooling, a dyestuff of the probable formula

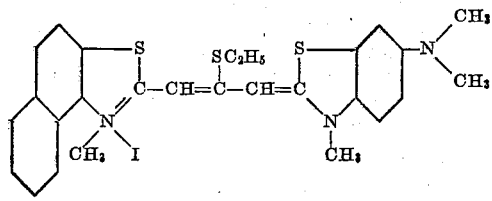

crystallizes.

*Example 14*

To 2 g. of the intermediate substance according to Example 12 and 1.52 g. of 2-methylbenzoselenazole dimethyl sulphate, dissolved in 125 cc. of methyl alcohol, are added 125 cc. of pyridine and the mixture is heated during 90 minutes. By means of a solution of potassium bromide 10% the formed carbocyanine of the probable formula

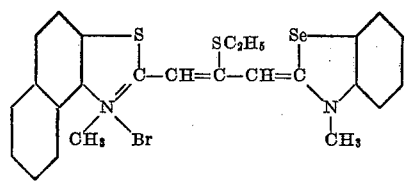

precipitates and it is purified by crystallization.

*Example 15*

To 2 g. of the intermediate substance according to Example 12 and 1.55 g. of 2-methyl-β-naphthothiazole dimethyl sulphate, dissolved in 100 cc. of methyl alcohol, is added 1 cc. of triethyl amine and the mixture is boiled for one hour. By adding a solution of potassium bromide 10%, the formed carbocyanine of the following probable formula

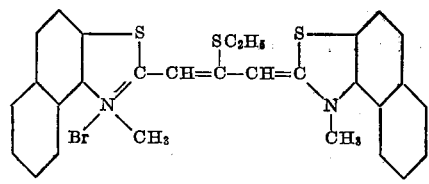

precipitates and is purified by crystallization.

*Example 16*

20 g. of 3-6-dimethyl-2-methylidene benzothiazole dithiocarboxylic acid are heated with 40 cc. of diethyl sulphate at 125° C. during two hours. After cooling, the mixture is washed with ether and dissolved in alcohol. This solution is treated with potassium iodide. After several hours, the deposit obtained is treated with alcohol and so freed from insoluble secondary products. The solution is treated with ether and an intermediate substance of the probable formula

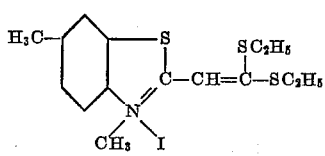

precipitates. The solution is crystallized from methyl alcohol. Melting point 197° C. Yield 8 g.

To 1.5 g. of this intermediate substance and 1 g. of 2-6-dimethyl-benzothiazole dimethyl sulphate, dissolved in 125 cc. of methyl alcohol, 1.5 cc. of triethylamine is added and the mixture is boiled during one hour. The formed symmetrical carbocyanine corresponding to the following probable formula is precipitated by means of a solution of potassium iodide 10%.

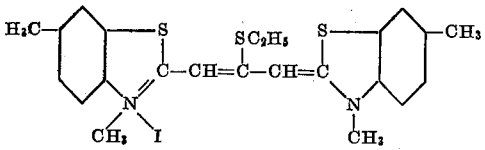

and it is purified by crystallization from ethyl alcohol.

*Example 17*

7 g. of 2-ethylidene-3-methylbenzothiazole dithiocarboxylic acid and 14 cc. of diethyl sulphate are heated at 125° C. during 90 minutes. The product so obtained is washed with ether and dissolved in 50 cc. of methyl alcohol. A solution of potassium iodide 10% is added. After several hours an intermediate substance of the probable formula

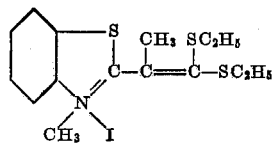

precipitates and it is recrystallized from alcohol. Melting point 179–185° C. Yield 3.5 g.

To 2.2 g. of this product and 1.62 g. of 2-methylbenzoselenazole dimethyl sulphate dissolved in 150 cc. of ethyl alcohol 1.5 cc. of triethylamine is added and the mixture is boiled during one hour. A dyestuff of the probable formula:

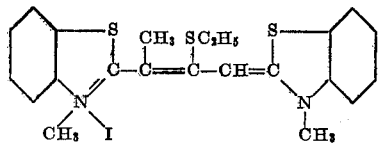

is obtained.

*Example 18*

2.5 g. of 2-methylidene-3-6-dimethyl-benzothiazole dithiocarboxylic acid and 5 g. of benzyl-p-toluenesulfonate are heated at 90° C. during one hour. After cooling, the reaction mixture is recrystallized from ethyl alcohol. The dyestuff intermediate obtained has the probable formula

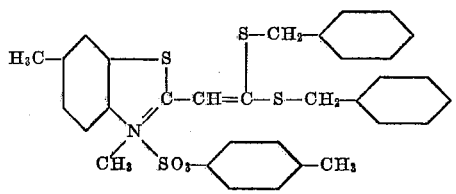

Melting point 201° C. Yield: 2.4 g.

To a solution of 2 g. of this intermediate and 0.85 g. of 2-methylbenzothiazol ethylbromide in 15 cc. absolute ethyl alcohol, 2 cc. of triethylamine are added. This mixture is refluxed for 40 minutes. After cooling, and adding of ether, a syrupy precipitate is obtained, and extracted with cold methyl alcohol. The solution in methyl alcohol is treated with a 20% aqueous solution of potassium iodide. A dye precipitates which is recrystallized from ethyl alcohol and corresponds to the probable formula

I claim:
1. A process for the manufacture of a carbocyanine dye substituted at the central carbon atom of the polymethine chain by a member selected from the group consisting of alkyl mercapto and aralkyl mercapto, comprising reacting a quaternary ammonium salt of a nitrogen-containing heterocyclic base which contains a reactive methyl group with a substance of the following general formula:

wherein
Y represents the non-metallic atoms required for completing a heterocyclic nucleus selected from the group consisting of 5-membered heterocyclic nuclei, and such nuclei having an aromatic ring fused on,
R and $R_1$ represent a substituent selected from the group consisting of alkyl and aralkyl, and
X represents an acid residue.

2. A process for the manufacture of a symmetrical carbocyanine dye substituted at the central carbon atom of the polymethine chain by a member selected from the group consisting of alkyl mercapto and aralkyl mercapto, comprising reacting a quaternary ammonium salt of a nitrogen-containing heterocyclic base which contains a reactive methyl group with a substance of the following general formula:

wherein
Y=the non-metallic atoms required for completing a heterocyclic nucleus selected from the group consisting of 5-membered heterocylic nuclei, and such nuclei having an aromatic ring fused on,
R and $R_1$=a substituent selected from the group consisting of alkyl and aralkyl, and
X=an acid residue.

3. A process for the manufacture of an unsymmetrical carbocyanine dye substituted at the central carbon atom of the polymethine chain by a member selected from the group consisting of alkyl mercapto and aralkyl mercapto, comprising reacting quaternary ammonium salt of nitrogen-containing heterocyclic bases which contain a reactive methyl group with a substance of the following general formula:

wherein

Y=the non-metallic atoms required for completing a heterocyclic nucleus selected from the group consisting of 5-membered heterocyclic nuclei, and such nuclei having an aromatic ring fused on,
R and $R_1$=a substituent selected from the group consisting of alkyl and aralkyl, and
X=an acid residue.

4. An unsymmetrical carbocyanine dye corresponding to the following general formula wherein Y and Y' the non-metallic atoms required for completing a heterocyclic nucleus selected from the group consisting of 5 membered heterocyclic nuclei, and such nuclei having an aromatic ring fused on, and wherein Y and Y' are different
R, R' and $R^2$ alkyl, X an acid residua.

5. A process for the manufacture of the dye corresponding to the following formula:

which comprises reacting 2-methyl-benzothiazole-dimethyl sulphate and a compound of the following formula:

and treating the reaction product with an aqueous KBr solution.

6. A dyestuff of the formula:

7. A dyestuff of the formula:

LEO ARNOLD VAN DE STRAETE.

REFERENCES CITED

The following references are of record in the file of this patent:

UNITED STATES PATENTS

| Number | Name | Date |
|---|---|---|
| 2,156,464 | Schulz | May 2, 1939 |
| 2,315,498 | Brooker | Apr. 6, 1943 |
| 2,397,013 | Kendall | Mar. 19, 1946 |
| 2,397,014 | Kendall | Mar. 19, 1946 |